Figure 1:
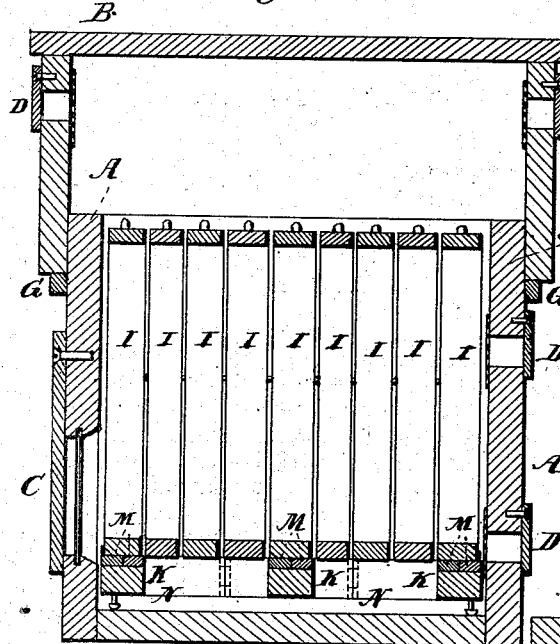
Figure 2:
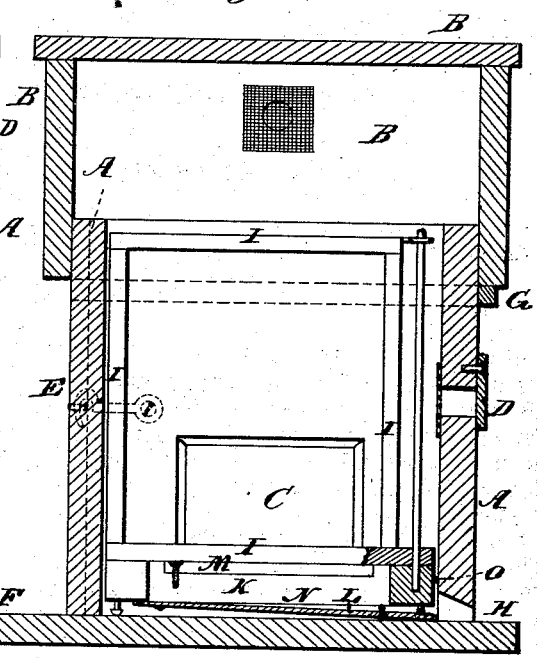
Figure 3:
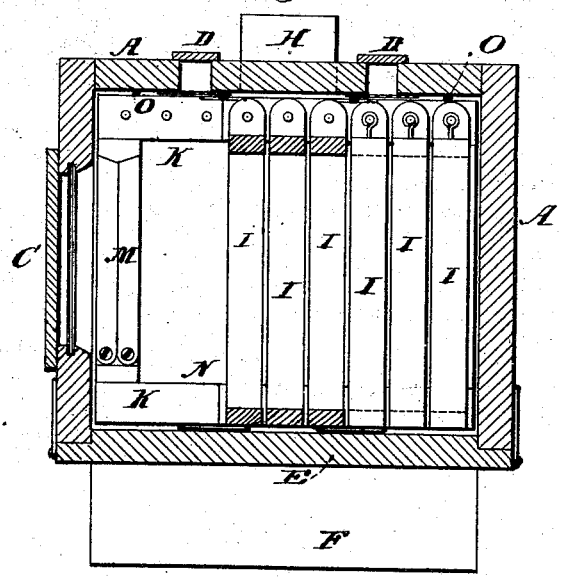

S. TILLOTSON.
Bee-Hives.

No. 155,475.  Patented Sept. 29, 1874.

Witnesses.
W. H. Compton
Uriah Ruthruff

Inventor.
Samuel Tillotson

UNITED STATES PATENT OFFICE.

SAMUEL TILLOTSON, OF BRONSON, MICHIGAN.

IMPROVEMENT IN BEE-HIVES.

Specification forming part of Letters Patent No. 155,475, dated September 29, 1874; application filed June 17, 1874.

*To all whom it may concern:*

Be it known that I, SAMUEL TILLOTSON, of Bronson, Branch county, Michigan, have invented a new and Improved Bee-Hive; and I do hereby declare that the following is a full, clear, and exact description of the same, reference being had to the accompanying drawing forming a part of the specification.

The invention relates to bee-hives; and consists in an improved construction, as hereinafter fully described, and pointed out in the claims.

A represents the box or outside covering of the hive. B represents the top part of hive or cap. C represents the window at side of the hive. D represents the flies over air-holes. E represents the door of the hive, being fastened by means of hook-and-eye latches. F represents the projected bottom of hive. G represents the slats which support the cap of the hive. H represents platform, where bees enter and depart from hive. I represents the nine (9) honey-frames, and are connected to large frame by means of wire hinges and perpendicular rods. K represents the three sections of the lower frame, which are attached together by two hinges and fasten in front with hooks and eyes. L represents the bee-board, being connected with middle section of lower frame, leaving sufficient space for bees to enter frames and deposit honey. M represents the frame-supporters, which are connected to lower sections of hive by means of screws. They support the honey-frames when the hive is opened for taking out the honey or cleaning the hive. N represents the large frames divided into three sections. They support and hold the honey-frames, and are elevated from bottom of hive by means of screws. The object of this is to give the bees room to go in in any part of the hive at will. O O represent the two spacing-studs which keep the frames a proper distance from back of hive, and for the purpose of protecting and not crushing the bees in removing the frames and putting them in place in hive.

Having thus described my invention, what I claim as new, and desire to secure by Letters Patent, is—

1. The frame N, divided into hinged sections K, and each section provided with supports M, for supporting and holding the comb-frames when the hive is opened.

2. The inclined board L, connected to the middle section K of the frame N, in combination with the opening in the platform H, for the purpose set forth.

SAMUEL TILLOTSON.

Witnesses:
W. H. COMPTON,
URIAH RUTHRUFF.